(12) United States Patent
Chen et al.

(10) Patent No.: US 12,106,095 B2
(45) Date of Patent: Oct. 1, 2024

(54) DEEP LEARNING-BASED JAVA PROGRAM INTERNAL ANNOTATION GENERATION METHOD AND SYSTEM

(71) Applicant: NANJING UNIVERSITY, Jiangsu (CN)

(72) Inventors: Lin Chen, Jiangsu (CN); Zhi Wang, Jiangsu (CN); Yanhui Li, Jiangsu (CN)

(73) Assignee: NANJING UNIVERSITY

( * ) Notice: Subject to any disclaimer, the term of this patent is extended or adjusted under 35 U.S.C. 154(b) by 0 days.

(21) Appl. No.: 18/554,899

(22) PCT Filed: Apr. 26, 2021

(86) PCT No.: PCT/CN2021/089827
§ 371 (c)(1),
(2) Date: Oct. 11, 2023

(87) PCT Pub. No.: WO2022/226716
PCT Pub. Date: Nov. 3, 2022

(65) Prior Publication Data
US 2024/0201984 A1  Jun. 20, 2024

(30) Foreign Application Priority Data

Apr. 25, 2021 (CN) .......................... 202110449761.5

(51) Int. Cl.
G06F 8/73  (2018.01)
G06F 8/75  (2018.01)

(52) U.S. Cl.
CPC . *G06F 8/73* (2013.01); *G06F 8/75* (2013.01)

(58) Field of Classification Search
CPC ..................................... G06F 8/73; G06F 8/75
See application file for complete search history.

(56) References Cited

U.S. PATENT DOCUMENTS

| 10,303,466 B1 | 5/2019 | Karman et al. |
| 2006/0074634 A1 | 4/2006 | Gao et al. |
| (Continued) | | |

FOREIGN PATENT DOCUMENTS

| CN | 108345457 A | 7/2018 |
| CN | 109783079 A | 5/2019 |
| (Continued) | | |

OTHER PUBLICATIONS

Yao Wan, Improving automatic source code summarization via deep reinforcement learning, Sep. 3, 2018, ASE '18: Proceedings of the 33rd ACM/IEEE International Conference on Automated Software Engineering, pp. 397-407 (Year: 2018).*

(Continued)

*Primary Examiner* — Wei Y Zhen
*Assistant Examiner* — Amir Soltanzadeh (57) ABSTRACT

A deep learning-based Java program internal annotation generation method and system is provided. The method includes acquiring items with a Stars number ranked in the top, and extracting corresponding internal annotations and method statement lists; obtaining an <annotation, target code> pair; selecting an annotation in a Verb-dobj form; obtaining a code context associated with a target code segment; preprocessing the annotation, the target code, and the context to obtain a triplet dataset; randomly dividing the constructed dataset into a training set, a validation set, and a test set, and constructing an encoder-decoder network at the same time; enabling the training set in division to be used for model training, performing evaluation on the validation set to obtain a model with the best effect on the validation set as a target model; and predicting data in the test set with the obtained target model to generate a predicted annotation.

11 Claims, 3 Drawing Sheets

(56) References Cited

U.S. PATENT DOCUMENTS

2022/0138266 A1* 5/2022 Wang .................... G06N 3/044
                                                707/722
2024/0069878 A1* 2/2024 Li .......................... G06N 3/09

FOREIGN PATENT DOCUMENTS

| CN | 109960506 A | 7/2019 |
| CN | 110018820 A | 7/2019 |
| JP | 2001005650 A | 1/2001 |

OTHER PUBLICATIONS

Christian D. Newman, An Ensemble Approach for Annotating Source Code Identifiers With Part-of-Speech Tags, Jul. 20, 2021, Published in: IEEE Transactions on Software Engineering (Year: 2021).*
CNIPA, first office action, Jul. 1, 2023, Chinese application No. 202110449761.5.
CNIPA, Notification to Grant Patent Right for invention, Aug. 10, 2023, Chinese application No. 202110449761.5.
International Searching Authority, ISR, Mar. 11, 2022, PCT Application No. PCT/CN2021/089827.
CNIPA, first office action, Jul. 1, 2023, Chinese application No. 202110449761,5, original Chinese copy.
CNIPA, Notification to Grant Patent Right for invention, Aug. 10, 2023, Chinese application No. 202110449761.5; original Chinese copy.

* cited by examiner

```
Seq2Seq(
 (encoder): RobertaModel(
  (embeddings): RobertaEmbeddings(
   (word_embeddings): Embedding(50265, 768, padding_idx=1)
   (position_embeddings): Embedding(514, 768, padding_idx=1)
   (token_type_embeddings): Embedding(1, 768)
  )
  (encoder): BertEncoder(
   (0): BertLayer((self): BertSelfAttention(in_features=768, out_features=768, bias=True))
   (1): BertLayer((self): BertSelfAttention(in_features=768, out_features=768, bias=True))
   (2): BertLayer((self): BertSelfAttention(in_features=768, out_features=768, bias=True))
   (3): BertLayer((self): BertSelfAttention(in_features=768, out_features=768, bias=True))
   (4): BertLayer((self): BertSelfAttention(in_features=768, out_features=768, bias=True))
   (5): BertLayer((self): BertSelfAttention(in_features=768, out_features=768, bias=True))
   (6): BertLayer((self): BertSelfAttention(in_features=768, out_features=768, bias=True))
   (7): BertLayer((self): BertSelfAttention(in_features=768, out_features=768, bias=True))
   (8): BertLayer((self): BertSelfAttention(in_features=768, out_features=768, bias=True))
   (9): BertLayer((self): BertSelfAttention(in_features=768, out_features=768, bias=True))
   (10): BertLayer((self): BertSelfAttention(in_features=768, out_features=768, bias=True))
   (11): BertLayer((self): BertSelfAttention(in_features=768, out_features=768, bias=True))
  )
  (pooler): BertPooler((activation): Tanh())
 )
 (decoder): TransformerDecoder(
  (0): TransformerDecoderLayer((self_attn | multihead_attn): _LinearWithBias(in_features=768, out_features=768, bias=True))
  (1): TransformerDecoderLayer((self_attn | multihead_attn): _LinearWithBias(in_features=768, out_features=768, bias=True))
  (2): TransformerDecoderLayer((self_attn | multihead_attn): _LinearWithBias(in_features=768, out_features=768, bias=True))
  (3): TransformerDecoderLayer((self_attn | multihead_attn): _LinearWithBias(in_features=768, out_features=768, bias=True))
  (4): TransformerDecoderLayer((self_attn | multihead_attn): _LinearWithBias(in_features=768, out_features=768, bias=True))
  (5): TransformerDecoderLayer((self_attn | multihead_attn): _LinearWithBias(in_features=768, out_features=768, bias=True))
 )
 (dense): Linear(in_features=768, out_features=768, bias=True)
 (lm_head): Linear(in_features=768, out_features=50265, bias=False)
 (lsm): LogSoftmax(dim=-1)
)
```

Fig. 3

DEEP LEARNING-BASED JAVA PROGRAM INTERNAL ANNOTATION GENERATION METHOD AND SYSTEM

FIELD

The present invention relates to a deep learning-based Java program internal annotation generation method and system, belonging to the technical field of Internet.

BACKGROUND

In software development and maintenance, developers spend about 59% of the time on program understanding activities. A source code annotation is an important constituent part of software. The source code annotation can help the developers understand codes and reduce the difficulty of code inspection. The code annotation describes code operations or program semantics in the form of natural language descriptions. Research has shown that codes with annotations are easier to understand than codes without annotations, and the code annotation is also considered as a key factor in evaluating code quality.

But in software development activities, due to time pressure and negligence in the development process, the developers do not always have the opportunity to carefully annotate newly written codes or update the annotations when changing the codes. Under the condition of neglecting the importance of the code annotations and other reasons, the code annotations are often lost or become outdated and mismatched during code change, and there are outdated annotations in many projects. Therefore, automatically generating the code annotations can help the developers save time for writing annotations and understanding the programs. In most cases, the developers do not annotate their codes, and only about 20% of methods have internal annotations. One solution to these problems is to automatically generate corresponding descriptive annotations for codes without annotations through learning code features. With the rapid development of deep learning methods in recent years, inspired by neural machine translation and sequence generation methods, model performance can be optimized under the training of mass of data by extracting code and annotation pairs from large-scale open source projects, and finally the codes are inputted into a trained model to output required descriptive annotation information.

The existing work mainly focuses on the study of method summary annotations, without paying attention to automatic generation of internal annotations of methods. The effect of migrating these methods to an internal annotation generation task is not clear, and there are three problems. Firstly, it is easier to generate the method summary annotations, as the method summary is often the first sentence described in natural language in function Javadoc, which clearly describes the functionality of the entire method. However, compared with semi-structured Javadoc, internal annotations of Java methods express more diverse and complex semantics. Some annotations are not directly related to the codes, so that it is more difficult to generate the internal annotations than generate the method summary. Secondly, in a method summary annotation generation task, the method summary has a clear target code, that is, the entire method body, but the recognition of the internal annotations and corresponding target codes cannot be directly determined. Thirdly, it is infeasible to directly migrate the method for generating summary annotations to internal annotations, as it is usually not enough to generate the internal annotations only by using the corresponding target codes. Target codes corresponding to different annotations in different projects may be similar. In addition to source code segments, more information should be considered, such as other codes in the method body.

SUMMARY

To overcome the shortcomings of the prior art and address the aforementioned technical problems, a deep learning-based Java program internal annotation generation method and system are provided. An objective of the present invention is to automatically generate an internal annotation for a code segment in the Java program, and by combining two types of information (target code and context code information), build a model by employing an encoder-decoder network in the field of deep learning, and use a pretrained language model CodeBERT as an encoder to improve the quality of annotation generation, assist developers in code understanding and reading, and improve code maintainability.

The present invention specifically adopts the following technical solution: a deep learning-based Java program internal annotation generation method, which includes the following steps:

step SS1: acquiring items with a Stars number ranked in the top from GitHub, then extracting method information in a Java source code with a static analysis tool JDT, then recognizing corresponding method information, and extracting corresponding internal annotations and method statement lists;

step SS2: traversing statements in the method information according to positions of the annotations, obtaining a statement list corresponding to the annotations through position information and data flow information, and obtaining an <annotation, target code> pair;

step SS3: performing filtration according to a type of the annotations and selecting an annotation in a Verb-dobj form;

step SS4: analyzing the data flow information implemented within the method information, and obtaining a code context associated with a target code segment according to a definition use relationship between variables;

step SS5: preprocessing the annotation, the target code, and the context, the preprocessing process including word segmentation, identifier splitting, and word lowercasing: and completing final processing to obtain a triplet dataset including <annotation, target code, code context>;

step SS6: randomly dividing the constructed dataset into a training set, a validation set, and a test set, and constructing an encoder-decoder network at the same time;

step SS7: enabling the training set in division in step SS6 to be used for model training, and performing evaluation on the validation set to obtain a model with the best effect on the validation set as a target model; and step SS8: predicting data in the test set with the target model obtained in step SS7 to generate a predicted annotation.

As a preferred embodiment, step SS1 specifically includes: acquiring Java items with the Stars number ranked in the top from GitHub to obtain 5281 items, downloading the items to local, and then extracting information in a Java method with the static analysis tool JDT, and extracting a code and annotations, each piece of annotation information includes a unique path, annotation text, type, start line, end line, statement list; the unique path includes file name+class name+method name+parameter name), the type includes line annotations or block annotations, and the start line and the end line, including a start line and an end line of a single-line annotation, are same.

As a preferred embodiment, step SS2 specifically includes: processing the data in step SS1, and determining a target code of the annotation according to positions of the annotation and the code and a relationship between the annotation and the code; firstly, determining that an initial target statement list for the annotation is all statements from a next line of the annotation to a statement segmented by a blank line or ended with a code block; then, more accurately selecting a target statement list corresponding to the annotation through definition use dependence of variables, semantic similarity dependence of the code, and code-annotation dependence; each data table entry is: <annotation information, target statement list, method statement list>.

As a preferred embodiment, step SS3 specifically includes: processing the annotations in step SS2, performing part-of-speech tagging and dependency parsing on the annotations by a Stanford coreNLP toolset, selecting an annotation starting with a verb and including a dobj direct object structure, and further removing included annotated codes and technical debts.

As a preferred embodiment, step SS4 specifically includes: based on the target statement list and the method statement list in step SS3, extracting a variable definition use relationship and a use definition relationship of variables in the target statement list and the method statement list through data flow analysis, and constructing a context statement list: and finally, each data table entry is: <annotation information, target statement list, context statement list>.

As a preferred embodiment, step SS5 specifically includes: processing the data in step SS4, firstly splitting identifiers in a statement by Camel-Case. and completing the processing process of the identifiers through regular expression design; then, splitting a Java code through punctuations and converting the code into a sequence of words that can be recognized by a deep learning model; meanwhile, performing word segmentation on an English annotation spaced by punctuations and spaces, and finally, converting the annotation and code to lowercase, and a presentation form of each piece of data is: <annotation, target code, context code>.

As a preferred embodiment, step SS6 specifically includes: randomly dividing the dataset obtained in step SS5 in a proportion of 800%:10%:10%, with the training set including 336457 pieces of data, and the validation set and the test set each including 42056 pieces of data; meanwhile, an entire model is of an encoder-decoder structure; an encoder CodeBERT uses bimodal data instances as an input for training in a pretraining stage, and a decoder employs 6 Transformer decoding layers to stack to construct an entire network.

As a preferred embodiment, step SS7 specifically includes: enabling the training set in step SS6 to be used as a model input for training and optimization, performing training by setting a target code length to be 100, a context code length to be 300, and an annotation length to be 30, performing model selection through the validation set, and selecting a model with the best performance on the validation set as the target model.

As a preferred embodiment, step SS8 specifically includes: generating a target annotation finally by using the remaining 10% of the test set in step SS6 as an input of the target model in step SS7.

The present invention further provides a deep learning-based Java program internal annotation generation system, which includes:

an annotation list extraction module, configured to: acquire items with a Stars number ranked in the top from GitHub, then extract method information in a Java source code with a static analysis tool JDT, then recognize corresponding method information, and extract corresponding internal annotations and method statement lists;

an annotation-code pair extraction module, configured to: traverse statements in the method information according to positions of the annotations, obtain a statement list corresponding to the annotations through position information and data flow information, and obtain an <annotation, target code> pair;

an annotation type filter module, configured to: perform filtration according to a type of the annotations and select an annotation in a Verb-dobj form;

a code context generation module, configured to: analyze the data flow information implemented within the method information, and obtain a code context associated with a target code segment according to a definition use relationship between variables;

a preprocessing module, configured to: preprocess the annotation, the target code, and the context, the preprocessing process including word segmentation, identifier splitting, and word lowercasing; and complete final processing to obtain a triplet dataset including <annotation, target code, code context>;

a dataset dividing module, configured to: randomly divide the constructed dataset into a training set, a validation set, and a test set, and construct an encoder-decoder network at the same time;

a model training module, configures to: enable the training set in division of the dataset dividing module to be used for model training, and perform evaluation on the validation set to obtain a model with the best effect on the validation set as a target model; and a predicted annotation generation module, configured to: predict data in the test set with the target model obtained by the model training module to generate a predicted annotation.

The present invention achieves the following beneficial effects: 1. According to the present invention, the internal annotations are automatically generated by using a deep learning method to help the developers better understand the code. The prior art mainly focuses on generating summary annotations of the Java method, however, the task of generating the internal annotations is more difficult. Therefore, through constructing the dataset proposing the model for training and testing, and performing evaluation, it finally indicates that the effect of generating the internal annotations in the present invention is better than that of an existing method. 2. According to the present invention, internal annotations with higher quality can be generated by combining the target code and context code corresponding to the internal annotations. By controlling the input, it is found that the effect of the combination of the target code and the context code is better than that of only using the target code, which cannot be utilized by the existing method. 3. According to the present invention, a pretrained programming language model CodeBERT is used as an encoder, thereby improving the learning ability of the model, and the quality of the generated annotations is higher than that of the annotations generated by the existing method.

BRIEF DESCRIPTION OF THE DRAWINGS

FIG. 3 is a schematic diagram of a network structure constructed by step SS6 of the present invention.

DETAILED DESCRIPTION

The present invention is further described below in conjunction with the accompanying drawings. The following embodiments are only intended to more clearly illustrate the technical solution of the present invention, and may not limit the scope of protection of the present invention.

Figure 1:
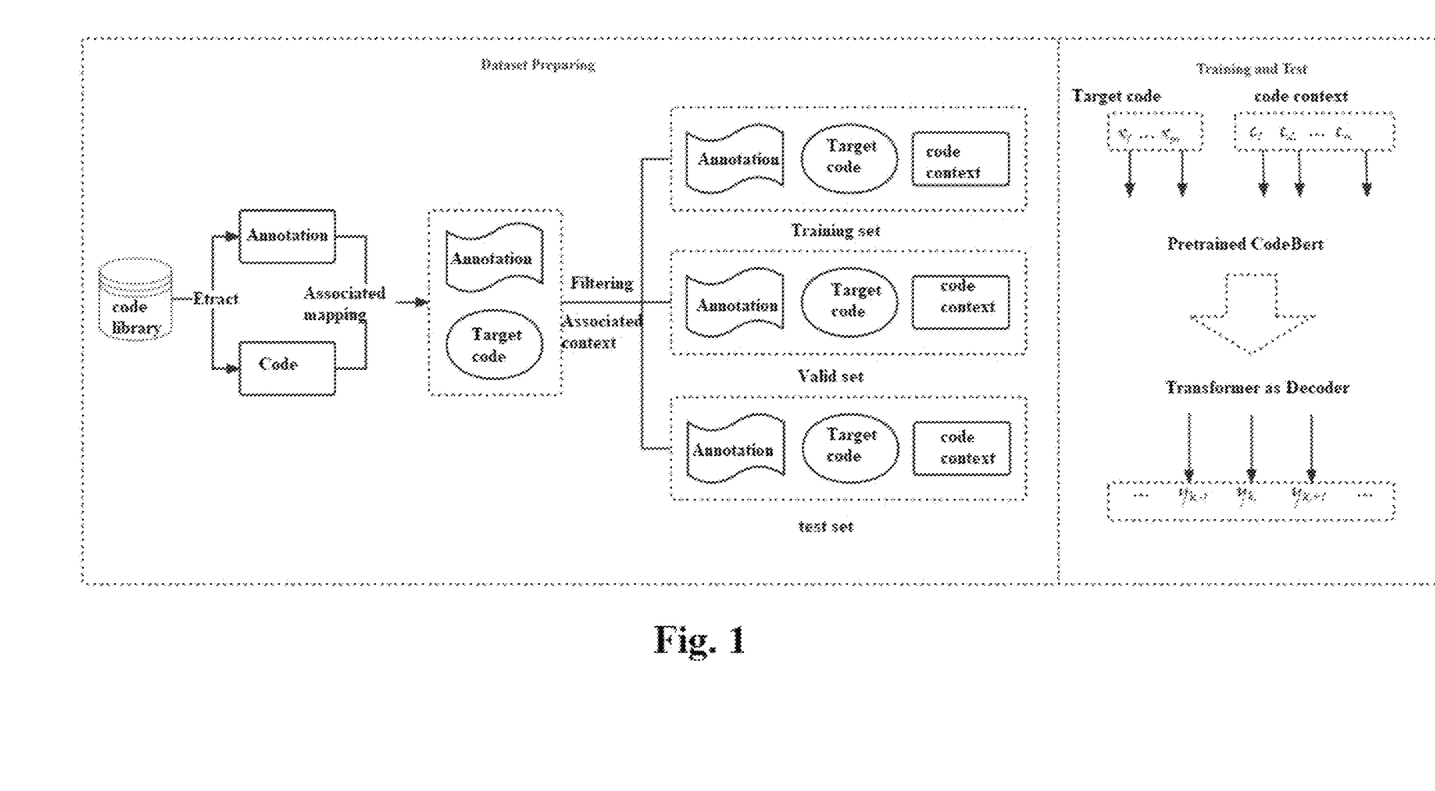
FIG. 1 is a flowchart of a preferred embodiment of a deep learning-based Java program internal annotation generation method according to the present invention.

Embodiment 1: As shown in FIG. 1, the present invention specifically adopts the following technical solution: a deep learning-based Java program internal annotation generation method, which includes the following steps:

step SS1: items with a Stars number ranked in the top are acquired from GitHub, then method information in a Java source code is extracted with a static analysis tool JDT, then corresponding method information is recognized, and corresponding internal annotations and method statement lists are extracted;

step SS2: statements in the method information are traversed according to positions of the annotations, a statement list corresponding to the annotations is obtained through position information and data flow information, and an <annotation, target code> pair is obtained;

step SS3: filtration is performed according to a type of the annotations and an annotation in a Verb-dobj form is selected;

step SS4: the data flow information implemented within the method information is analyzed, and a code context associated with a target code segment is obtained according to a definition use relationship between variables;

step SS5: the annotation, the target code, and the context are preprocessed, the preprocessing process includes word segmentation, identifier splitting, and word lowercasing; and final processing is completed to obtain a triplet dataset including <annotation, target code, code context>;

step SS6: the constructed dataset is randomly divided into a training set, a validation set, and a test set, and an encoder-decoder network is constructed at the same time;

step SS7: the training set in division in step SS6 is enabled to be used for model training, and evaluation is performed on the validation set to obtain a model with the best effect on the validation set as a target model; and step SS8: data in the test set is predicted with the target model obtained in step SS7 to generate a predicted annotation.

Preferably, step SS1 specifically includes: Java items with the Stars number ranked in the top are acquired from GitHub to obtain 5281 items, the items is downloaded to local, and then information in a Java method is extracted with the static analysis tool JDT, and a code and annotations are extracted, each piece of annotation information includes a unique path, annotation text, type, start line, end line, statement list; the unique path includes file name+class name+method name+parameter name), the type includes line annotations or block annotations, and the start line and the end line, including a start line and an end line of a single-line annotation, are same.

Preferably, step SS2 specifically includes: the data in step SS1 is processed, and a target code of the annotation according to positions of the annotation and the code and a relationship between the annotation and the code is determined: firstly, an initial target statement list for the annotation is determined as all statements from a next line of the annotation to a statement segmented by a blank line or ended with a code block: then, a target statement list corresponding to the annotation is more accurately selected through definition use dependence of variables, semantic similarity dependence of the code, and code-annotation dependence; each data table entry is: <annotation information, target statement list, method statement list>.

Figure 2:
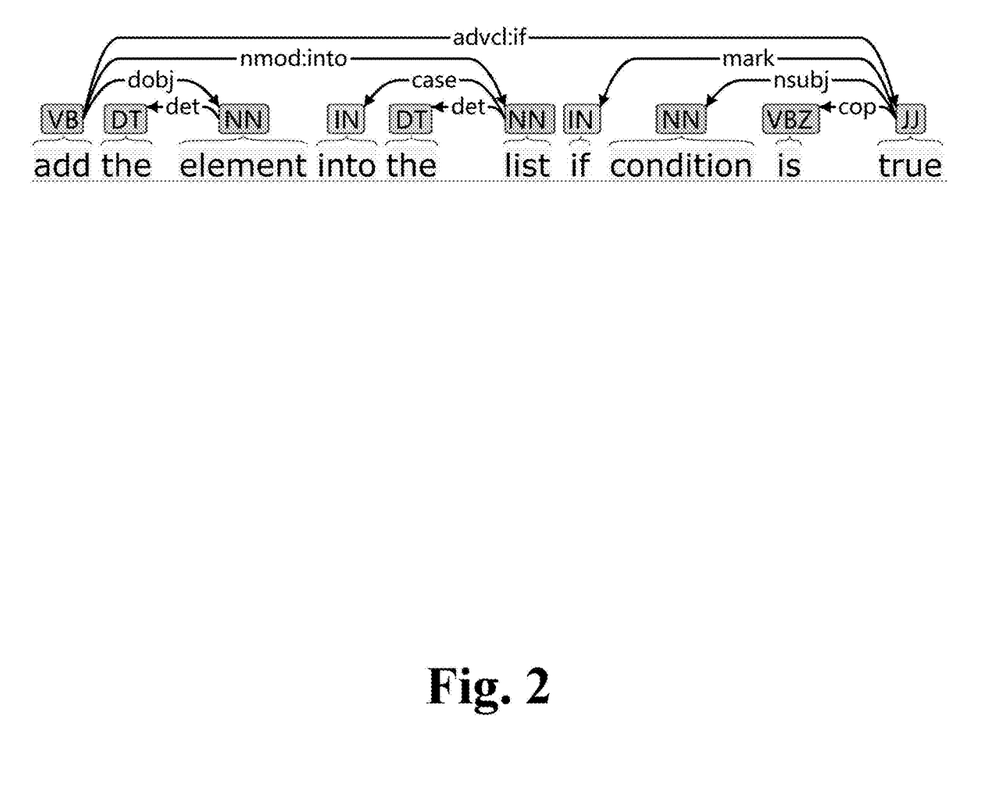
FIG. 2 is a schematic diagram of an example of performing part-of-speech tagging and dependency parsing on an annotation according to the present invention.

Preferably, step SS3 specifically includes: the annotations in step SS2 are processed, part-of-speech tagging and dependency parsing are performed on the annotations by a Stanford coreNLP toolset, an annotation starting with a verb and including a dobj direct object structure is selected, and further included annotated codes and technical debts are removed. FIG. 2 shows a schematic diagram of an example of performing part-of-speech tagging and dependency parsing on an annotation according to the present invention.

Preferably, step SS4 specifically includes: based on the target statement list and the method statement list in step SS3, a variable definition use relationship and a use definition relationship of variables are extracted in the target statement list and the method statement list through data flow analysis, and a context statement list is constructed; and finally, each data table entry is: <annotation information, target statement list, context statement list>.

Preferably, step SS5 specifically includes: the data in step SS4 is processed, firstly identifiers in a statement is split by Camel-Case, and the processing process of the identifiers is completed through regular expression design; then, a Java code is split through punctuations and the code is converted into a sequence of words that can be recognized by a deep learning model; meanwhile, word segmentation is performed on an English annotation spaced by punctuations and spaces, and finally, the annotation and code are converted to lowercase, and a presentation form of each piece of data is: <annotation, target code, context code>.

Preferably, step SS6 specifically includes: the dataset obtained in step SS5 is randomly divided in a proportion of 80%:100%:10%, with the training set including 336457 pieces of data, and the validation set and the test set each including 42056 pieces of data; meanwhile, the entire model is of an encoder-decoder structure; an encoder CodeBERT uses bimodal data instances (natural language NL and programming language PL) as an input for training in a pre-training stage, and a decoder employs 6 Transformer decoding layers to stack to construct the entire network. The network structure is as shown in FIG. 3.

Preferably, step SS7 specifically includes: the training set in step SS6 is enabled to be used as a model input for training and optimization, training is performed by setting a target code length to be 100, a context code length to be 300, and an annotation length to be 30, model selection is performed through the validation set, and a model with the best performance on the validation set is selected as the target model.

Preferably, step SS8 specifically includes: a target annotation is generated finally by using the remaining 10% of the test set in step SS6 as an input of the target model in step SS7.

Embodiment 2: The present invention further provides a deep learning-based Java program internal annotation generation system, which includes:
- an annotation list extraction module, configured to: acquire items with a Stars number ranked in the top from GitHub, then extract method information in a Java source code with a static analysis tool JDT, then recognize corresponding method information, and extract corresponding internal annotations and method statement lists;
- an annotation-code pair extraction module, configured to: traverse statements in the method information according to positions of the annotations, obtain a statement list corresponding to the annotations through position information and data flow information, and obtain an <annotation, target code> pair;
- an annotation type filter module, configured to: perform filtration according to a type of the annotations and select an annotation in a Verb-dobj form;
- a code context generation module, configured to: analyze the data flow information implemented within the method information, and obtain a code context associated with a target code segment according to a definition use relationship between variables;
- a preprocessing module, configured to: preprocess the annotation, the target code, and the context, the preprocessing process including word segmentation, identifier splitting, and word lowercasing: and complete final processing to obtain a triplet dataset including <annotation, target code, code context>;
- a dataset dividing module, configured to: randomly divide the constructed dataset into a training set, a validation set, and a test set, and construct an encoder-decoder network at the same time;
- a model training module, configures to: enable the training set in division of the dataset dividing module to be used for model training, and perform evaluation on the validation set to obtain a model with the best effect on the validation set as a target model; and
- a predicted annotation generation module, configured to: predict data in the test set with the target model obtained by the model training module to generate a predicted annotation.

It should be noted that the present invention provides the deep learning-based Java program internal annotation generation method and system, which generate the internal annotations in the method by using the encoder-decoder network. Firstly, the present invention focuses on Java programs. At present, Java is one of the most popular programming languages in the field of software development, and it is widely used in various fields and industries. In fact, an encoder-decoder model is used in the present invention, and the model is trained and optimized on a constructed large-scale dataset through the pretrained CodeBERT. Finally, according to the present invention, through evaluating the generation results and compared with annotations generated by the existing method, annotations with better quality are generated. The specific technical solution of the present invention includes three aspects: dataset construction, model construction, and training evaluation.

In the aspect of dataset construction, according to the present invention, a Java source code is acquired from a GitHub open source project; source code information is extracted from the Java source code: a corresponding method is recognized; and internal annotations and a corresponding code are extracted. The statements in the method body are traversed according to the position of the annotation, a statement list corresponding to the annotations is obtained through position information and data flow information, and the <annotation, target code> pair is obtained. Then filtration is performed according to the type of the annotation, and an annotation in the Verb-dobj form is selected. This type of annotations describes the behavior of the code in a fixed mode, which can help the developers understand the code very well. The code context associated with the target code segment is obtained by analyzing the data flow information implemented within the method according to the definition use relationship between variables, and the annotations, the target code, and the context are preprocessed. The preprocessing process mainly includes word segmentation, identifier splitting, word lowercasing, and the like to obtain a final dataset.

In the aspect of model construction, the encoder-decoder network is employed in the present invention. The encoder part employs the pretrained language model CodeBERT, and the decoder employs 6 Transformer decoding layers to stack, and internal annotations, and a corresponding target code and context code are inputted.

In the aspect of model training evaluation, according to the present invention, the constructed dataset is randomly divided into the training set, the validation set, and the test set. The training set is used for model training and optimization: moreover, evaluation is performed on the validation set to select the model with the best effect on the validation set as the target model. The data in the test set is predicted by using the target model. The generated predicted annotation is compared with a tagged annotation to evaluate the performance differences among various models. Through BLEU indicator evaluation, the method of the present invention can generate internal annotations with high quality.

The foregoing are only preferred embodiments of the present invention. It is to be pointed out that for those of ordinary skilled in the art, without departing from the principles of the present invention, several improvements and variations may also be made, and these improvements and variations should also be regarded as the scope of protection of the present invention.

What is claimed is:

1. A deep learning-based Java program internal annotation generation method performed via a processor, comprising the following steps:
   - step SS1: acquiring items with a Stars number ranked in a top from GitHub, then extracting method information in a Java source code with a static analysis tool Java Development Tools (JDT), then recognizing corresponding method information, and extracting corresponding internal annotations and method statement lists;
   - step SS2: traversing statements in the method information according to positions of the annotations, obtaining a statement list corresponding to the annotations through position information and data flow information, and obtaining an <annotation, target code> pair;
   - step SS3: performing filtration according to a type of the annotations and selecting an annotation in a Verb direct object (Verb-dobj) form;

step SS4: analyzing the data flow information implemented within the method information, and obtaining a code context associated with a target code segment according to a definition use relationship between variables;

step SS5: preprocessing the annotation, the target code, and the code context, the preprocessing process comprising word segmentation, identifier splitting, and word lowercasing; and completing final processing to obtain a triplet dataset including <annotation, target code, code context>;

step SS6: randomly dividing the constructed dataset into a training set, a validation set, and a test set, and constructing an encoder-decoder network to build a model of an encoder-decoder structure, wherein, inputting natural language and programming language data into an encoder CodeBERT for training in a pretraining stage, and employing 6 Transformer decoding layers to stack as a decoder;

step SS7: inputting data in the training set into the model in step SS6 to perform model training, and performing evaluation on the validation set to obtain a model with a best effect on the validation set as a target model; and step SS8: inputting data in the test set into the target model obtained in step SS7 to generate a predicted annotation.

2. The deep learning-based Java program internal annotation generation method according to claim 1, wherein step SS1 specifically comprises: acquiring Java items with the Stars number ranked in the top from GitHub to obtain 5281 items, downloading the items to local, and then extracting information in a Java method with the static analysis tool JDT, and extracting a code and annotations, each piece of annotation information comprises a unique path, annotation text, type, start line, end line, statement list; the unique path comprises file name+class name+method name+parameter name, the type comprises line annotations or block annotations), and the start line and the end line, comprising a start line and an end line of a single-line annotation, are same.

3. The deep learning-based Java program internal annotation generation method according to claim 1, wherein step SS2 specifically comprises: processing the data in step SS1, and determining a target code of the annotation according to positions of the annotation and the code and a relationship between the annotation and the code; firstly, determining that an initial target statement list for the annotation is all statements from a next line of the annotation to a statement segmented by a blank line or ended with a code block; then, more accurately selecting a target statement list corresponding to the annotation through definition use dependence of variables, semantic similarity dependence of the code, and code-annotation dependence; each data table entry is: <annotation information, target statement list, method statement list>.

4. The deep learning-based Java program internal annotation generation method according to claim 1, wherein step SS3 specifically comprises: processing, via the processor, the annotations in step SS2, using a Stanford coreNLP toolset to perform part-of-speech tagging and dependency parsing on the annotations, to select an annotation starting with a verb and comprising a dobj direct object structure, and to further remove comprised annotated codes and technical debts.

5. The deep learning-based Java program internal annotation generation method according to claim 3, wherein step SS4 specifically comprises: based on the target statement list and the method statement list in step SS3, extracting a variable definition use relationship and a use definition relationship of variables in the target statement list and the method statement list through data flow analysis, and constructing a context statement list; and finally, each data table entry is: <annotation information, target statement list, context statement list>.

6. The deep learning-based Java program internal annotation generation method according to claim 1, wherein step SS5 specifically comprises: processing the data in step SS4, firstly splitting identifiers in a statement by Camel-Case, and completing a processing process of the identifiers through regular expression design; then, splitting a Java code through punctuations and converting the code into a sequence of words that can be recognized by a deep learning model; meanwhile, performing word segmentation on an English annotation spaced by punctuations and spaces, and finally, converting the annotation and code to lowercase, and a presentation form of each piece of data is: <annotation, target code, context code>.

7. The deep learning-based Java program internal annotation generation method according to claim 1, wherein step SS6 specifically comprises; randomly dividing the dataset obtained in step SS5 in a proportion of 80%:10%:10%, with the training set comprising 336457 pieces of data, and the validation set and the test set each comprising 42056 pieces of data.

8. The deep learning-based Java program internal annotation generation method according to claim 1, wherein step SS7 specifically comprises: enabling the training set in step SS6 to be used as a model input for training and optimization, performing training by setting a target code length to be 100, a context code length to be 300, and an annotation length to be 30, performing model selection through the validation set, and selecting a model with the best performance on the validation set as the target model.

9. The deep learning-based Java program internal annotation generation method according to claim 1, wherein step SS8 specifically comprises: generating a target annotation finally by using the remaining 10% of the test set in step SS6 as an input of the target model in step SS7.

10. A deep learning-based Java program internal annotation generation system, comprising a processor which is configured to:
acquire items with a Stars number ranked in a top from GitHub, then extract method information in a Java source code with a static analysis tool Java Development Tools (JDT), then recognize corresponding method information, and extract corresponding internal annotations and method statement lists;
traverse statements in the method information according to positions of the annotations, obtain a statement list corresponding to the annotations through position information and data flow information, and obtain an <annotation, target code > pair;
perform filtration according to a type of the annotations and select an annotation in a Verb direct object (Verb-dobi) form;
analyze the data flow information implemented within the method information, and obtain a code context associated with a target code segment according to a definition use relationship between variables;
preprocess the annotation, the target code, and the code context, the preprocessing process comprising word segmentation, identifier splitting, and word lowercasing; and complete final processing to obtain a triplet dataset including <annotation, target code, code context>;

randomly divide the constructed dataset into a training set, a validation set, and a test set, and construct an encoder-decoder network to build a model of an encoder-decoder structure, wherein, natural language and programming language data are inputted into an encoder CodeBERT for training in a pretraining stage, and 6 Transformer decoding layers are employed to stack as a decoder;

input data in the training set into the model to perform model training, and perform evaluation on the validation set to obtain a model with a best effect on the validation set as a target model; and input data in the test set into the target model obtained by the model training module to generate a predicted annotation.

11. A deep learning-based Java program internal annotation generation method performed via a processor, comprising the following steps:

constructing a dataset,
wherein, acquiring a Java source code from a GitHub open source project, extracting source code information, recognizing a corresponding method, and extracting annotations and corresponding code from the Java source code, traversing statements in the corresponding method according to positions of the annotation, obtaining a statement list corresponding to the annotations through position information and data flow information, and obtaining an <annotation, target code> pair, performing filtration according to a type of the annotation which describes a behavior of the code in a fixed mode, selecting an annotation in a Verb direct object (Verb-dobj) form, obtaining a code context associated with a target code segment by analyzing data flow information implemented within the method according to a definition use relationship between variables, and preprocessing the annotations, the target code, and the code context to obtain the dataset;

constructing a model of an encoder-decoder structure,
wherein, inputting natural language and programming language data into an encoder CodeBERT for training in a pretraining stage, and employing 6 Transformer decoding layers to stack as a decoder; and training and optimizing the model,
wherein, randomly dividing the dataset into a training set, a validation set, and a test set, inputting data in the training set into the model to perform model training, and performing evaluation on the validation set to select a model with a best effect on the validation set as a target model, and inputting data in the test set into the target model to generate internal annotations.

* * * * *